United States Patent
Lehnert et al.

(10) Patent No.: US 6,663,992 B2
(45) Date of Patent: Dec. 16, 2003

(54) COOLING RIB ARRANGEMENT FOR THE EQUALIZATION OF THE TEMPERATURE DISTRIBUTION IN AIR COOLED STACKS

(75) Inventors: Werner Lehnert, Julich (DE); Martin Wohr, Grosse-Gerau (DE); Stephan Fell, Florsheim (DE); James H. Lee, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 192 days.

(21) Appl. No.: 09/770,709

(22) Filed: Jan. 26, 2001

(65) Prior Publication Data

US 2001/0023035 A1 Sep. 20, 2001

(30) Foreign Application Priority Data

Feb. 20, 2000 (DE) .......................................... 100 07 763

(51) Int. Cl.$^7$ .......................... H01M 8/12; H01M 8/10; H01M 2/14
(52) U.S. Cl. ............................ 429/26; 429/32; 429/38; 429/39
(58) Field of Search ............................ 429/26, 120, 32, 429/34, 38, 39

(56) References Cited

U.S. PATENT DOCUMENTS

| | | | |
|---|---|---|---|
| 3,990,913 A | | 11/1976 | Tuschner ..................... 429/26 |
| 4,324,844 A | * | 4/1982 | Kothmann ................... 429/26 |
| 5,162,167 A | * | 11/1992 | Minh et al. ................... 429/30 |
| 5,252,410 A | * | 10/1993 | Wilkinson et al. ............ 429/33 |

FOREIGN PATENT DOCUMENTS

| | | |
|---|---|---|
| DE | 4426692 | 9/1995 |
| DE | 19602315 | 7/1997 |
| DE | 19636904 | 11/1997 |
| DE | 19802038 | 7/1999 |
| DE | 19802315 | 7/1999 |
| DE | 19821767 | 11/1999 |
| DE | 69514567 | 8/2000 |
| GB | 2339067 | 1/2000 |

* cited by examiner

*Primary Examiner*—Stephen Kalafut
*Assistant Examiner*—Julian Mercado
(74) *Attorney, Agent, or Firm*—Cary W. Brooks

(57) ABSTRACT

A fuel cell arrangement consisting of several fuel cells, arranged at least essentially in parallel, with cooling gaps formed between neighboring cells extending between an inlet and an outlet and through which a coolant flows, characterized by the fact that the specific surface, i.e. the area of the cooling surfaces emitting heat to the coolant, increases in the direction from the inlet to the outlet and/or that the local heat transfer coefficient of the cooling areas emitting heat to the coolant increases in the direction of flow from the inlet to the outlet and/or that the support materials of the fuel cells, i.e. the membrane-electrode assemblies, exhibit a coefficient of thermal conductivity above 200 W/(m·K). In this way, a uniform temperature in the fuel cells can be assured to that the power density can be increased while avoiding hot spots and/or the service life can be increased.

5 Claims, 7 Drawing Sheets

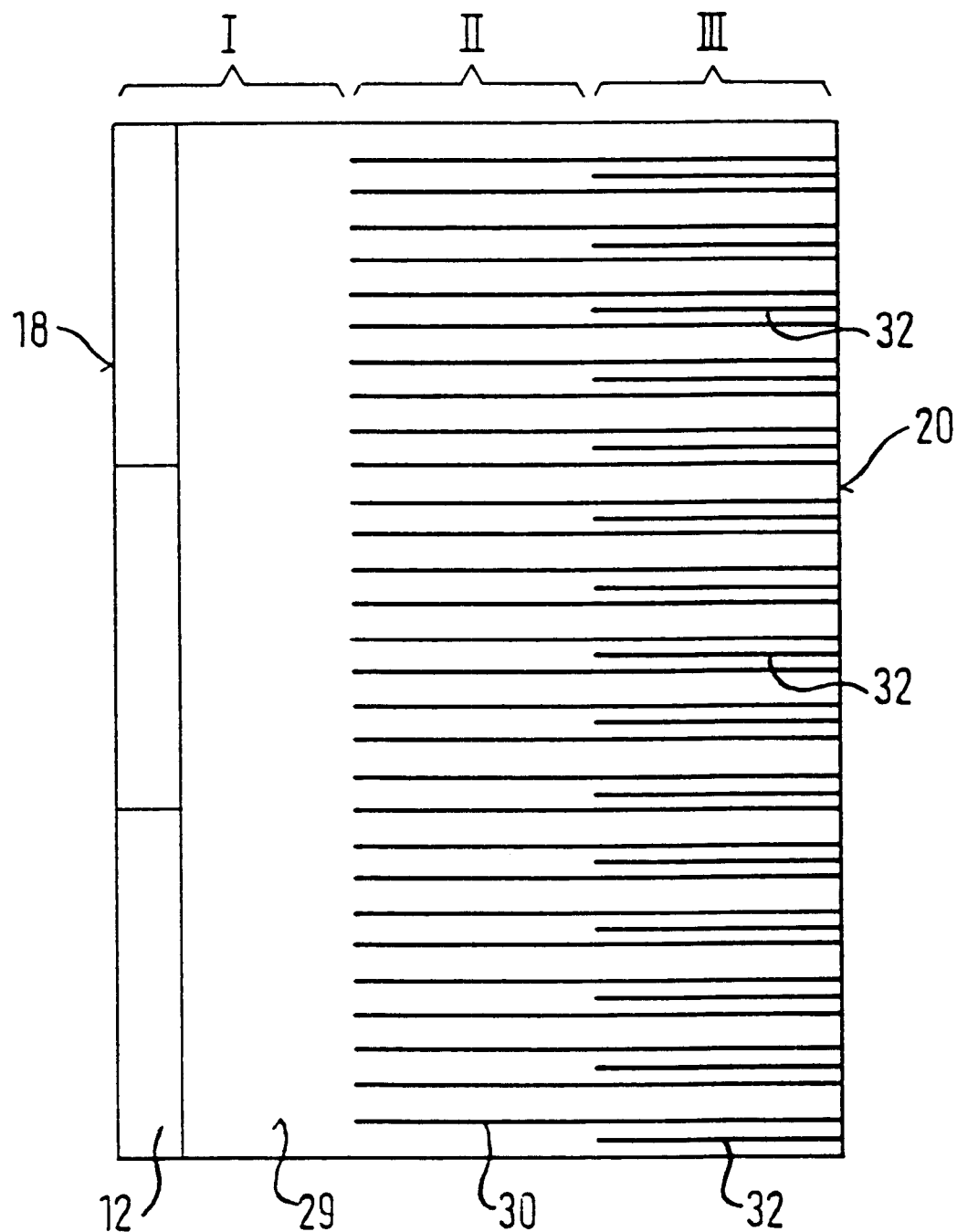

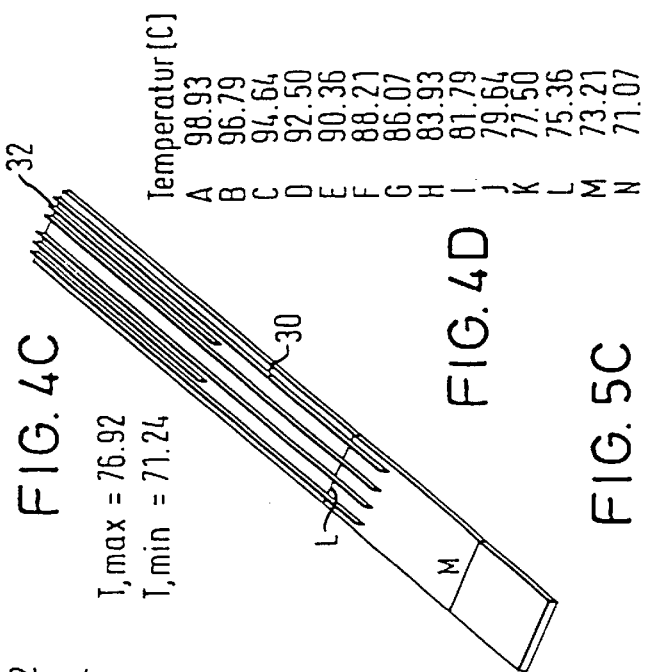
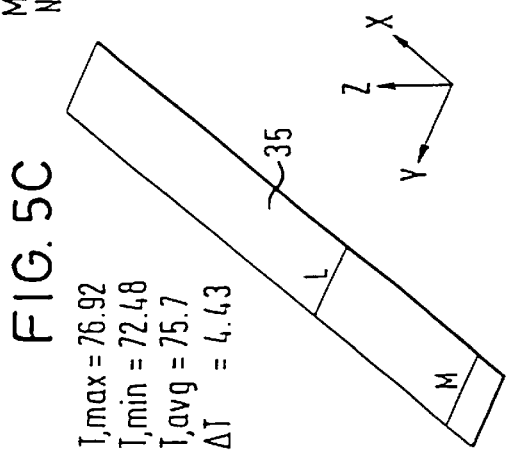
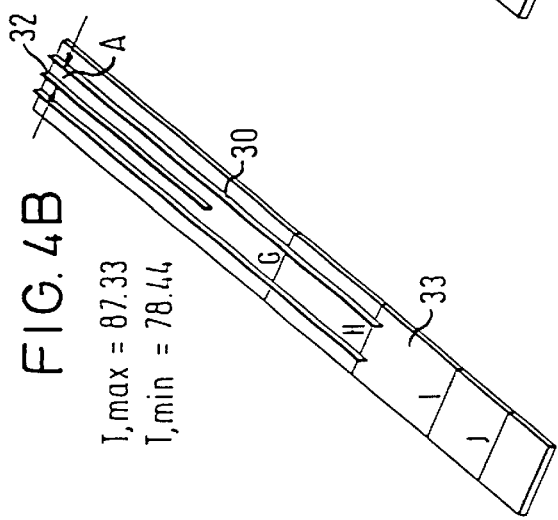
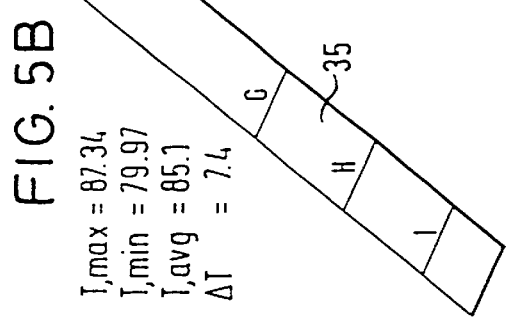
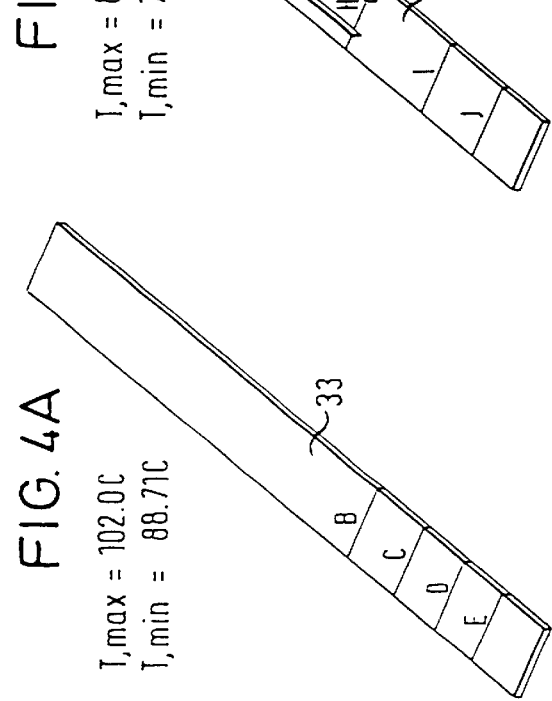
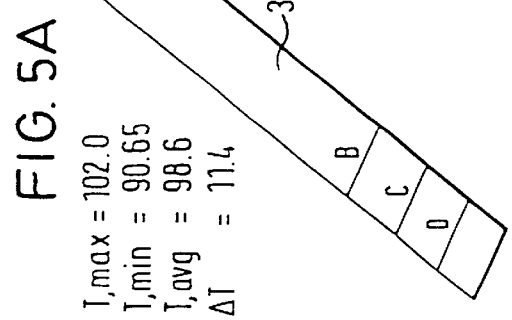

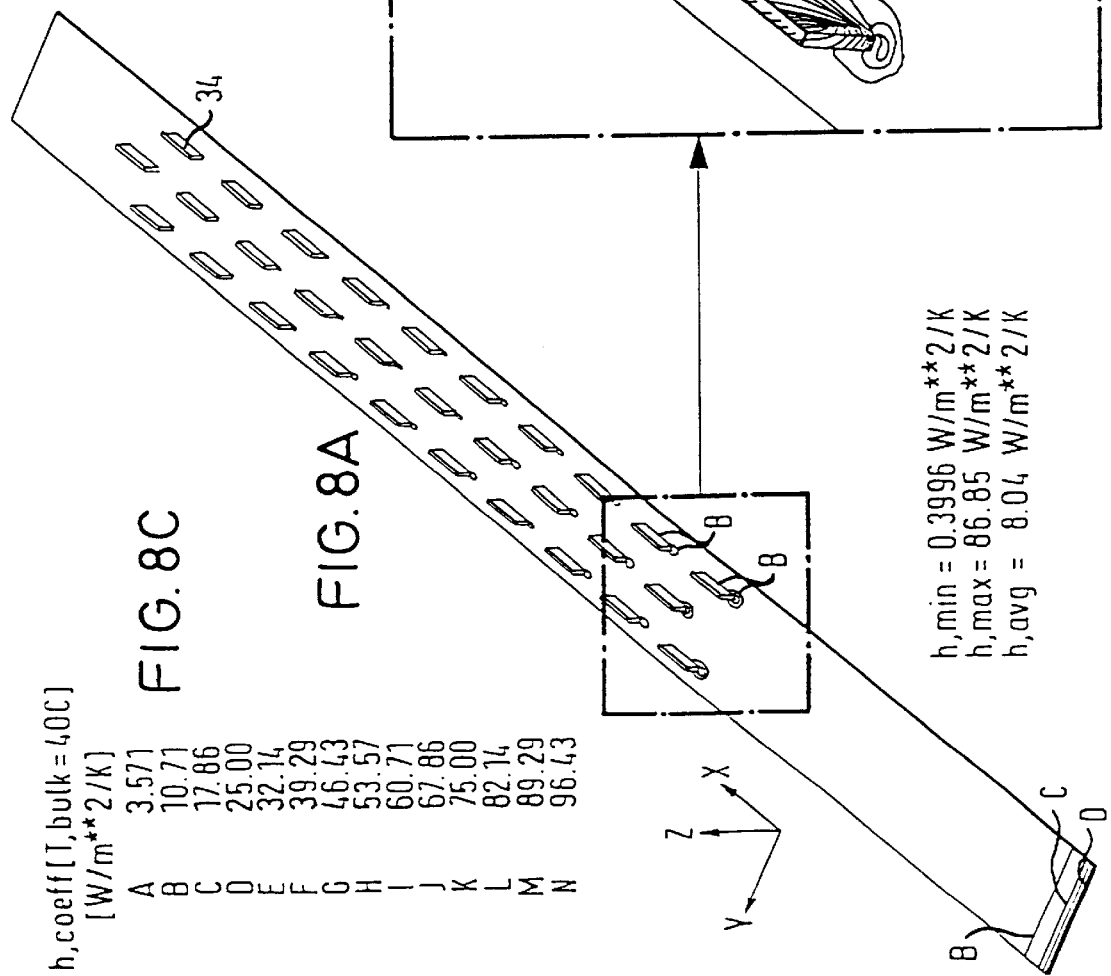

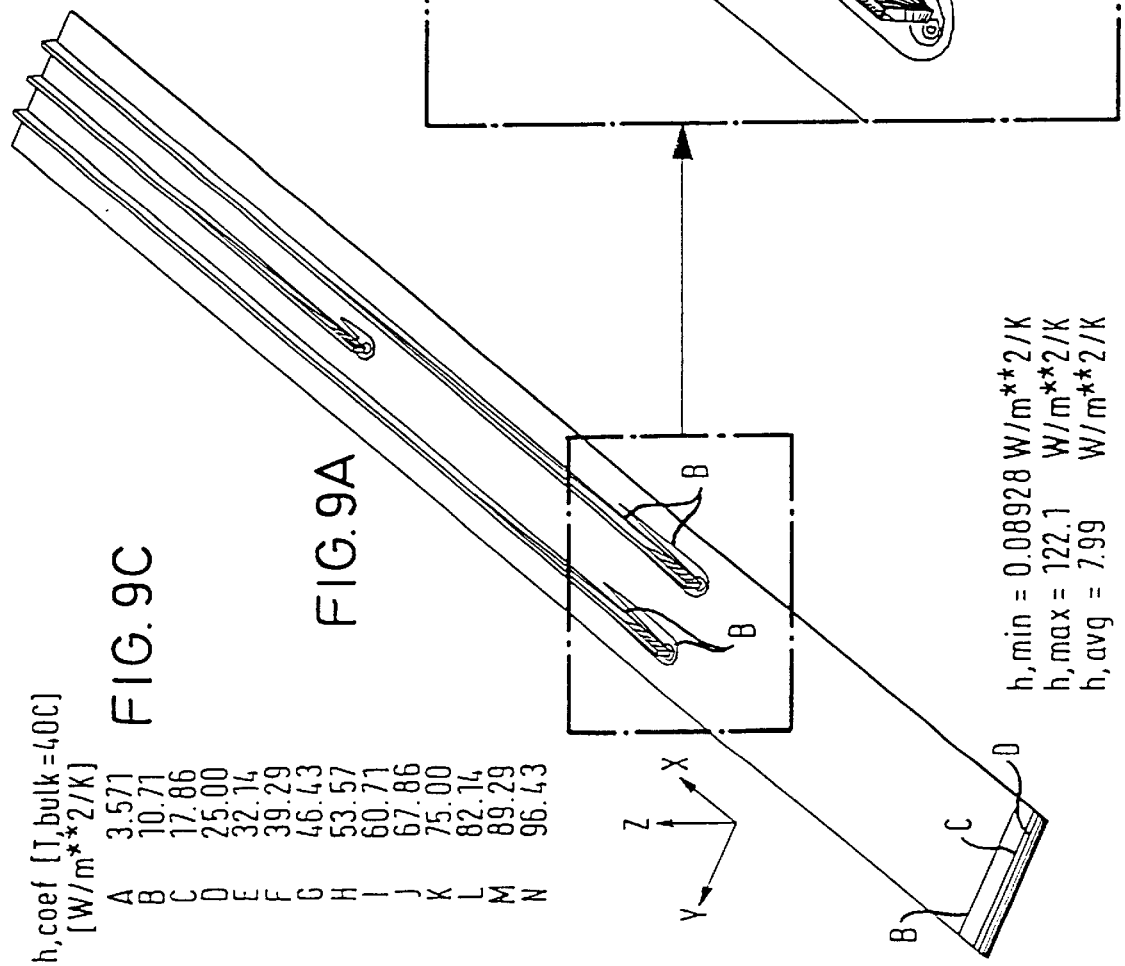

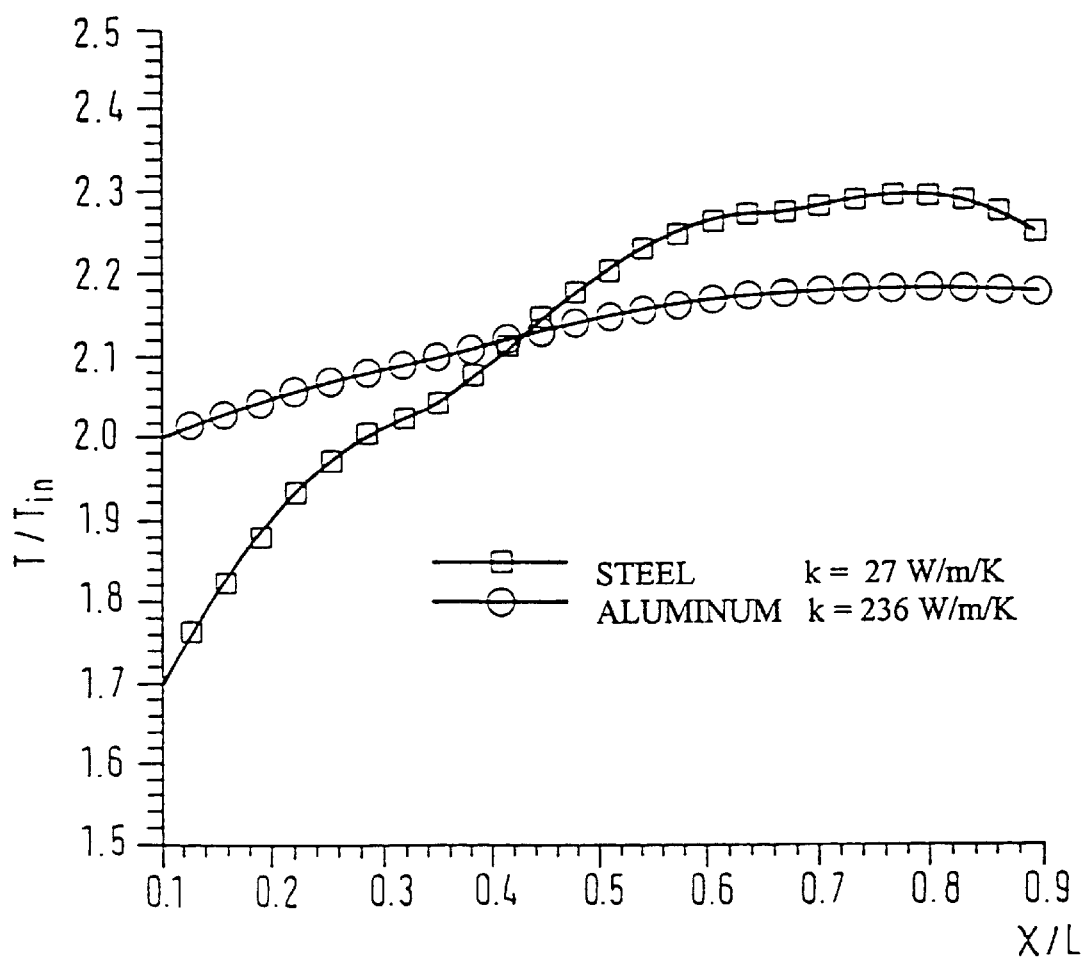

COOLING RIB ARRANGEMENT FOR THE EQUALIZATION OF THE TEMPERATURE DISTRIBUTION IN AIR COOLED STACKS

TECHNICAL FIELD

The present invention concerns a fuel cell arrangement consisting of several fuel cells, arranged at least essentially in parallel, with cooling gaps formed between neighboring cells extending between an inlet and an outlet and through which a coolant flows.

BACKGROUND OF THE INVENTION

Low-temperature fuel cells (PEMFC) transform chemical energy directly into electrical energy. Hydrogen is used as the fuel gas. The oxidant is pure oxygen or the oxygen contained in the air. Individual cells are wired together mechanically and electrically into stacks.

Fuel cells have a load-dependent efficiency of about 50%. The heat losses must be carried off by a corresponding cooling system. In most cases this is accomplished by means of water circulation with an external cooler. Air-cooled cells or stacks are also known. Because of the absence of water pumps, water coolers, etc. such a system is clearly simpler than a comparable water-cooled system. The cells have dimensions typically of $10 \times 10$ cm$^2$ to $30 \times 30$ cm$^2$. The thickness of the cells is 1 to 2.5 mm. The air gap or cooling gap through which the coolant, usually in the form of air, flow is ca. 1–4 mm wide.

Analysis of the existing technology of air-cooled PEMFC stacks has shown that a significant temperature difference prevails in the membrane-electrode assembly (MEA). This temperature difference leads to a nonuniform current density distribution inside the cell with a reduced possible maximum power of the cells as a result.

Typically 50–100 kW electric power are required for use in automobiles. Stack sizes of 100 to 400 cells are derived on the basis of this requirement and depending on the size and power density (ca. 0.6 W/cm$^2$) of the individual cells.

For cooling the stack it is necessary to blow air through the cooling gaps with a blower. Both the outsides of the cells as well as the spaces between the cells which are distributed uniformly over the cell area in the form of cooling fins serve as the heat transfer surface. The necessary power of the cooling blower for cooling a 50 kW stack should not exceed an order of 1–2 kW. Greater capacities would too strongly reduce the efficiency of the entire system in the automobile. Experience has shown that the cooling air is clearly heated up inside the stack under these conditions. From this, there results a distinct temperature difference in the MEA between the cooling air inlet and the cooling air outlet of the same order of magnitude, e.g. of about 30° C. From this, because of the temperature dependence of the reactions taking place in the cell and the transport phenomena (electrochemistry, electrocatalysis, evaporation, condensation, material transport of gases and liquids in porous media in channels, etc.), the current density distribution inside the individual cells becomes inhomogeneous. In the case of a required average current density per cell this may lead locally to very high current densities which can cause destruction of the cell.

SUMMARY OF THE INVENTION

The objective of the present invention is to design the cooling system of the cells in such a way that the temperature difference in the MEA is clearly smaller than previously, e.g., is reduced to 10° C. or less, in which case the cooling air despite this may have a temperature difference of e.g., 30° C.

To solve this problem according to the invention in a first variant, a fuel cell arrangement of the type described initially is envisioned in which the specific surface, i.e., the area of the cooling surfaces emitting heat to the coolant increases in the direction from the inlet to the outlet.

In a second variation of the solution according to the invention, a fuel cell arrangement of the type described initially is envisioned, which is characterized by the fact that the local heat transfer coefficient of the cooling surfaces emitting heat to the coolant increases in the direction of flow from the inlet to the outlet.

In a third variant of the solution according to the invention, also in the case of a fuel cell arrangement of the type described initially, it is envisioned that the carrier materials of the fuel cells, i.e., the membrane electrode assemblies, have a thermal conductivity above 200 W/(m·K), a thermal conductivity which is reached, for example, by aluminum or aluminum alloys.

In a fourth variant of the invention, the cooling gaps can be designed to produce flow gradients, e.g. as a result of built-in structural elements, for the purpose of increasing the local holding time along the cooling gaps so that heat removal constantly increases.

These four solutions or variants according to the invention can also be combined with each other advantageously.

Although it would be most favorable according to the invention if the specific surface and/or the local heat transfer coefficient of the cooling surfaces emitting heat to the coolant increased continuously from the inlet to the outlet, a good approximation of the desired result can be achieved if the cooling gaps are subdivided into several regions in the direction of flow from the inlet to the outlet, with the specific surface or the coefficient o thermal conductivity exceeding in each region the specific surface or coefficient of thermal conductivity in the previous region. A subdivision into two regions would already bring about a significant improvement compared to the state of the art. A subdivision into three regions, however, is preferred according to the invention, and subdivision into four or more regions could also be considered if the length of the cooling gaps in the flow direction permitted such a subdivision.

The starting point of the invention was the question of how an ideal approximately isothermal operating state of the MEA can be realized with a sufficient and homogeneous supply of oxygen and hydrogen. Starting with this ideal operating state of the MEA, a constant current density distribution and accordingly also a constant heat loss per unit area would be established which is passed on to the air-cooled solid (support material) in which the MEA is embedded.

The convective heat transfer from the solid to the air and the heat conduction inside the carrier medium can now be configured according to the invention by the corresponding cooling fin arrangement including the choice of material in such a way that in good approximation a homogeneous heat loss flux is established from the MEA to the support material.

The invention has succeeded, as explained below, in reducing the maximum temperature of the MEA by 25% and the temperature gradient by 61% when the first variant of the invention is used. By changing the coefficient of thermal conductivity corresponding to the second variant of the invention, a decrease in the maximum temperature of the MEA by about 6% and a reduction of the temperature gradient by about 13% can be achieved. If aluminum is used as the support material in the fuel cell with a coefficient of thermal conductivity of 236 W/mK than a reduction of the maximum temperature of the MEA by 5% and a distinct reduction of the temperature gradient can be achieved. If one combines all three of these possibilities envisioned according to the invention, than a significantly more efficient cooling can be achieved so that the required driving power of the blower required can be clearly reduced as can the structural size, the weight and the cost of the cooling system.

On the other hand, it is assured that the current density distribution inside the fuel cells is significantly more uniform and can be operated closer to the maximum limit without the occurrence of premature failure of the fuel cells due to elevated current densities at certain unpredictable places. On the whole, the fuel cells can b built smaller for a specific power, which saves weight, space and cost.

Preferred variants of the invention are described in the subclaims.

BRIEF DESCRIPTION OF THE DRAWINGS

The invention will be explained in more detail below from the aspect of the technological background and with reference to examples of embodiment illustrated by the drawings which show:

FIG. 3 is an enlarged representation of the active region of the fuel cell in FIG. 2 on the heat-removing side facing the cooling gap;

FIGS. 4A–4C each show representative strips of the wall of a cooling gap, said strip extending from the inlet to the outlet, with the local variation of temperature being indicated by contour lines indicated by letters, with FIG. 4A showing the temperature distribution for a conventional fuel cell, while FIGS. 4B and 4C show the temperature distribution for two variants according to the invention;

FIG. 4D shows a temperature scale to explain the coordination between the letters used in FIGS. 4A–4C and 5A–5C with respect to the prevailing temperatures in each case;

FIGS. 5A–5C show temperature diagrams from which the temperature distribution along three strips of the MEA is illustrated by FIGS. 4A–4C, i.e., in the case of horizontal arrangement of the fuel cell directly below (or above) the corresponding strip;

FIG. 8A is a strip of the wall of the cooling gap of a fuel cell arrangement extending in the direction of flow from the inlet to the outlet and corresponding to the second variant of the invention, with increasing heat transfer coefficient in various regions, the local variation of the heat transfer coefficient being represented by using contour lines denoted by letters;

FIG. 8B is an enlarged representation of the strip region denoted by the square in FIG. 8A;

FIG. 8C is the coordination of the heat transfer coefficient with the letters used in FIGS. 8A and 8B;

FIG. 9A shows a strip of the wall of the cooling gap of the fuel cell arrangement extending in the direction of flow from the inlet to the outlet and designed according to the third variant of the invention, with increasing heat transfer coefficient in various regions;

FIG. 9B is an enlarged representation of the region of the strip designated in FIG. 8A by the square in order to illustrate the local variation of the heat transfer coefficient, using contour lines denoted by letters, with the support material consisting of steel;

FIG. 9C shows the coordination of the heat transfer coefficients with the letters used; and FIG. 10 is a graphic representation of the temperature distribution of the MEA along the length L of the cooling gap in the direction of flow, using different support materials in the form of steel and aluminum.

DESCRIPTION OF THE PREFERRED EMBODIMENT

Figure 1:
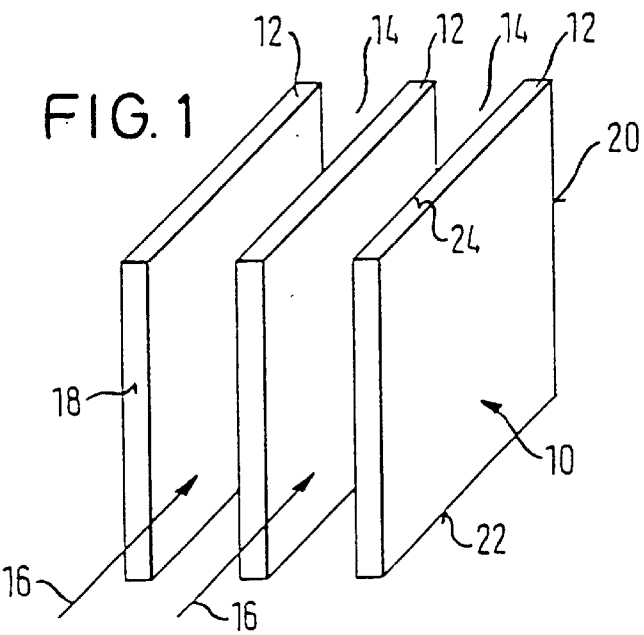
FIG. 1 is a schematic representation to explain the structure of a fuel cell arrangement with cooling gaps formed between neighboring fuel cells, with FIG. 1 showing a vertical arrangement of the fuel cells stacked side by side, although a horizontal or even a slanting arrangement of fuel cells could come into consideration.

Referring to FIG. 1, in extremely schematic form a segment of a fuel cell arrangement 10 is shown, here consisting of the three low-temperature fuel cells 12, i.e., membrane electrode assemblies, which are arranged at a distance from each other so that cooling gaps 14 are formed between each two neighboring cells 12 arranged parallel to each other. The arrows 16 show a flow of cooling air which is generated by a blower and passes through the cooling gap 14 from an inlet side 18 to an outlet side 20, the direction of the flow of the cooling air running parallel to the upper and lower sides 22 and 24 of the fuel cell 12, this direction will be designated the X direction in the following. The flow of hydrogen and oxygen inside the individual fuel cells 10 can also be directed in the X direction or in another direction such as perpendicular or oblique to the X direction. The exact flow direction for these gases is of no consequence for the present invention.

Not shown in FIG. 1 but present in the state of the art are spacers between the individual membrane cells which also assure the removal of heat to the cooling air. In the state of the art, neither the cooling gaps, nor such spacers are designed as per the invention so as to assure a uniform current density in the fuel cells and a reduced overall temperature of the fuel cells as well as a lower temperature gradient along the flow direction.

Figure 2:
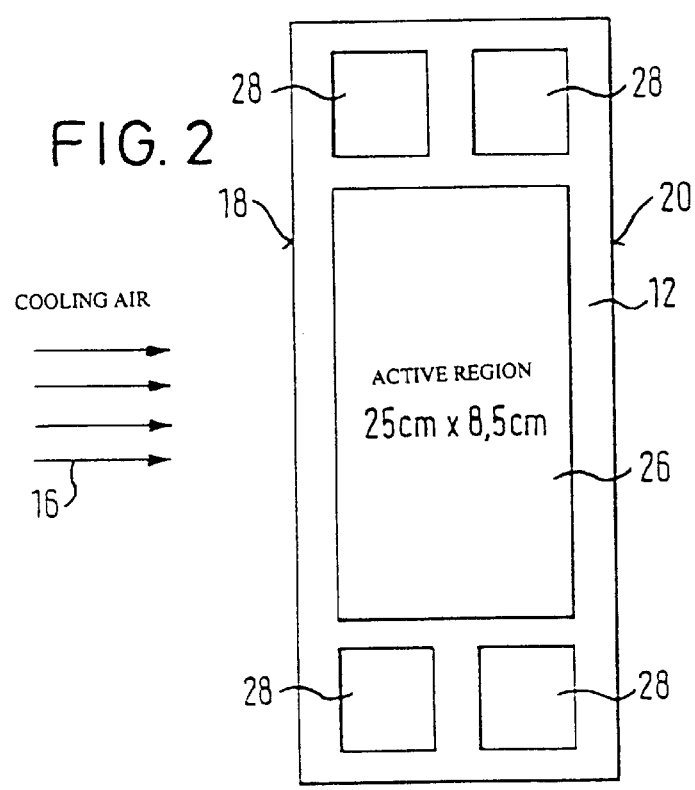
FIG. 2 is a top view of a complete cell in order to show one possible geometry, with the cooling fins being omitted in FIG. 2 for the sake of clarity.

FIGS. 2 and 3 show a possible geometry of a complete fuel cell according to the invention on the side facing toward the cooling gap 14. Heat which is generated in the electrochemically active region 26 of the fuel cell in question (i.e. in the MEA) (here shown as a rectangle with the dimensions of 25 cm×8.5 cm) is carried off by the cooling air 16 which enters from the inlet side 18 in FIG. 2 and flows toward the outlet side 20. The reference number 28 indicates channels integrated into the fuel cells through which a hydrogen-rich synthetic gas, on the one hand, and air, on the other, are introduced along the fuel cell arrangement and into the individual fuel cells for the purpose of generating current. That is to say, in this example the cooling air flow 16 is perpendicular to the flow direction of the hydrogen and oxygen to the fuel cells or from bottom to top in FIGS. 2 and 3.

The enlarged representation of FIG. 3 shows the cooling gap 14 subdivided into three regions I, II and III in such a way that region I is free of cooling fins, i.e., has a planar surface, region II is provided with continuous cooling fins 30 which are distributed at regular intervals to each other over the height of the cooling gap shown in FIG. 3 and in region III although the fins 30 are continued, every other intervening space is further subdivided by a shorter cooling fin 32. However, the possibility exists of subdividing all of the intervening spaces with the shorter cooling fins or even to configure the subdivision in a different way. This involves a practical example which represents the optimum at the present time.

From the representation in FIG. 3, one can clearly see that the specific surface which is available for transferring heat from fuel cell 12 to the cooling air in region I is smallest (since only the planar surface 29 is present there), in region II due to the cooling fins 30 it increases and in region III because of the additional cooling fins 32 it increases further. This means that the specific surface of the cooling areas emitting heat to the coolant increases in the direction from the inlet 18 to the outlet 20. In other words, the specific surface of the cooling area emitting heat to the coolant per unit length increases in the direction of flow and over a constant width measured in the direction from the inlet to the outlet 20.

Regions I, II and III in this example are each of the same length, and taken together, have a total length of 10.5 cm (=3×3.5 cm).

The aspects according to which such a cooling fin arrangement can be configured can be perceived from the following equations (I) and (II):

Equation (I) describes the heat flux (q) emitted to the coolant by convection which must be held fairly constant over the entire heat transfer areas (A). it is important that in such a homogeneous heat flux distribution inside the carrier medium of the membrane-electrode assembly 12 in each case the carrier medium itself should also assume an almost constant temperature ($T_{carrier}$).

$$q = \int_A \alpha \cdot \underbrace{(T_{carrier} - T_{fluid})}_{\Delta T} \cdot dA/A \quad (1)$$

where:

q heat flux [W/m$^2$]

α local heat transfer coefficient [W/m$^2$/K]

$T_{fluid}$ local temperature of coolant [K 1]

$T_{carrier}$ local temperature of carrier material [K]

ΔT local temperature difference between carrier material and coolant [K]

A total heat transfer surface [m$^2$].

Equation (2) describes the conduction of the heat flux q inside the isotropic heat-conducting support material of the MEA:

$$q = k \cdot \nabla T \quad (2)$$

where:

q heat flux [W/m$^2$]

k thermal conductivity [W/m/K]

∇T local temperature of the support material [K].

If one realizes the fact that the local temperature difference (ΔT) between support material and coolant decreases in the flow direction with increasing heating of the coolant, than one can conclude from equation (1) that one can select from two possibilities of intervention in order to keep the heat flux (q) nevertheless constant:

1. Increasing the heat transferring area part ΔA/A in the flow direction.
2. Increasing the local heat transfer coefficient α in the flow direction.

Due to the fact that as a result of the increase in the area or the increase in the local heat transfer coefficient in the flow direction minor inhomogeneities in the heat flux and accordingly also temperature fluctuations of the MEA can not be avoided, one can also conclude from equation (2) that:

3. The coefficient of thermal conductivity (k) of the support material should be as large as possible. The greater the value of the thermal conductivity coefficient, the smaller are the temperature gradients which form in the case when heat flux inhomogeneities appear.

All three configuration aspects to be considered for realization of the ideal isothermal operating state of the MEA of an air-cooled stack will now be described separately below and their functionality demonstrated by coupled three-dimensional flow and heat transfer calculations. A combination of all three configuration aspects is possible.

a) Description of a Geometry for Increasing the Heat Transferring Area in the Flow Direction (First Variant of the Invention)

The diagram of FIG. 3 shows as an example a possible arrangement of cooling fins 30,32. In the intake zone T of the cooling air, there are no cooling fins. The heat transfer from solid to cooling air takes place only through the cell surface 29. The increase in the heat transfer area in the direction of flow of the cooling air is realized by cooling fins. In this example, after 33% of the running length, cooling fins 30 are arranged in the form shown in region II. After 66% of the length, additional cooling fins 32 are arranged in the form shown in region III.

How such a cooling fin arrangement influences the temperature differences inside the MEA can be perceived from FIGS. 4 and 5. FIGS. 4A–4C show the three-dimensional distribution of the surface temperature of the support material of the MEA 12 and MEA 12 itself. FIGS. 5A through 5C show the corresponding temperature distribution of the MEA relative to the air inlet temperature ($T_{in}$) in the longitudinal direction (X direction). These representations are valid for a representative strip 33 extending in the X direction along the cooling gap or for a corresponding neighboring strip 35 of the MEA 26.

In this study, three different cooling fin arrangements were analyzed in each case with constant material properties of the stack, and in each case with the same boundary conditions for the cooling air stream. The first case (FIG. 4A) consisted of an arrangement without cooling fins. The second and third cases (FIGS. 4B and 4C) consisted of an arrangement with different spacing intervals of the cooling fins in the Y direction perpendicular to the flow direction X, i.e., 2.50 mm in FIG. 4B (i.e. the smallest distance measured in III is 2.50 mm) and 1.25 mm in the case of FIG. 4C (here also this distance is the smallest distance measured in region III).

In FIGS. 4 and 5, the temperature distributions are described by plotting isotherms as lines and denoting them with letters. The temperature scale in FIG. 4D indicates the coordination between the letters used and the corresponding temperatures. The three-dimensional temperature distribution represented in FIGS. 4 and 5 clearly shows that with increasing heat transfer area in the direction of flow, both the absolute temperature of the walls of the cooling gap and of the MEA as well as the gradient of the temperature curve of the MEA in the flow direction (X-direction) can clearly be lowered. In the cases shown here, the maximum temperature drops by 25% and the temperature gradient by 61% in the case of the variant shown in FIG. 4C and in FIG. 5C according to the invention compared to the reference example shown in FIGS. 4A and 5A.

In these examples, the support material consists of aluminum. The cooling air enters from below into the cooling gap and flows in the positive X direction which was arranged perpendicularly.

Figure 6:
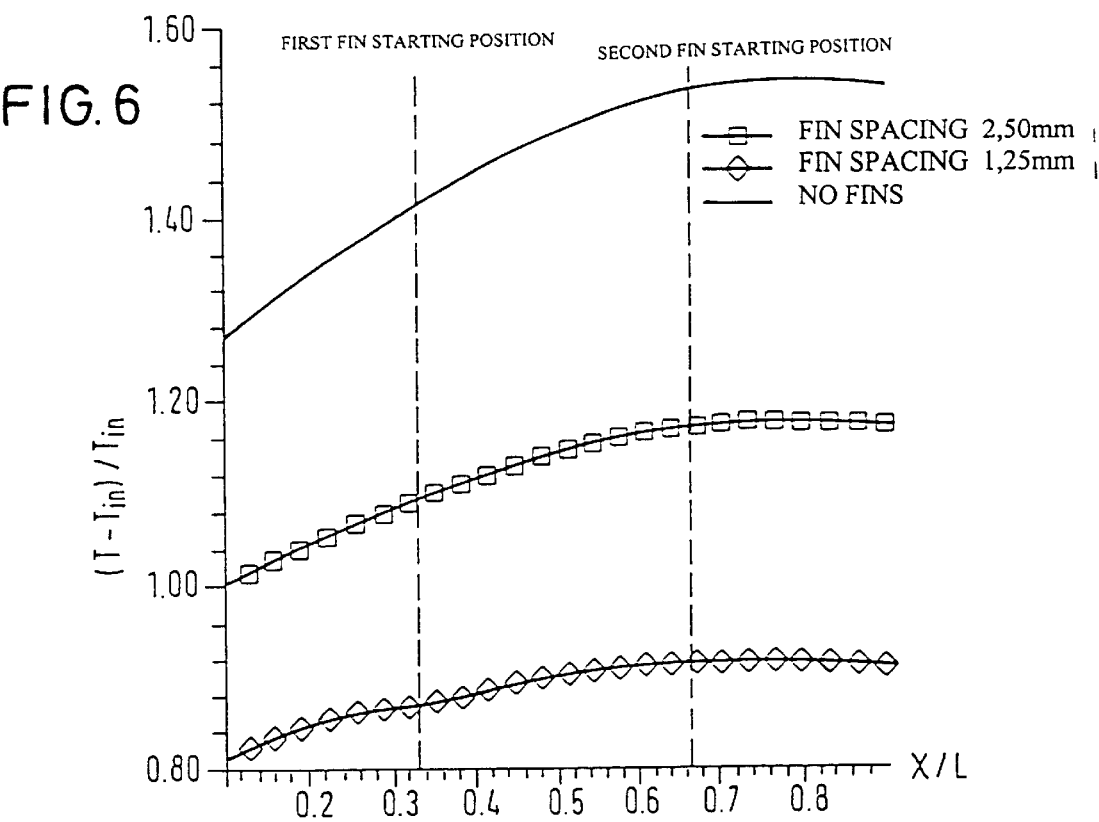
FIG. 6 is a standardized representation of the temperature difference of the cooling air along the length L of the cooling gap in relation to the input temperatures.

FIG. 6 shows in a standardized graphic representation the effect of the invention with respect to the temperature of the MEA 12 and the total temperature gradient occurring.

Here as the ordinate, the function $(T-T_{in}/T_{in})$ is shown as a function of the position along the X direction of the cooling gap, i.e. in the flow direction from the inlet to the outlet of the cooling gap. In FIG. 6, three curves are shown: the curve plotted as a continuous line corresponds to the arrangement in FIG. 4A without cooling fins, the line provided with squares corresponds to the arrangement according to FIG. 4B, in which the spacing distance of the fins is 2.5 mm, while the lower curve which is denoted by diamonds shows the corresponding curve for the arrangement according to FIG. 4C with a fin spacing of 1.25 mm.

T here indicates the local temperature of the MEA 12 in the longitudinal direction (X direction) in FIGS. 5A through 5C, while $T_{in}$ is the air inlet temperature which can be considered constant. Therefore, it becomes clear that the average temperature level for the three variants shown is different. Therefore, it is immediately apparent that the temperature T for an MEA 12 without fins, i.e. for a cooling gap without fins, is clearly higher than for the MEA shown in FIG. 4B with cooling area increasing the direction of flow and cooling fins spaced 2.5 mm apart and that, in turn, it is clearly higher than for the best variant according to FIG. 4C with a fin spacing of 1.25 mm.

The difference between the value of the function at the inlet of the MEA and the corresponding value at the outlet from the MEA reflects the temperature gradients in the MEA. From FIG. 6, it is apparent that the temperature gradient in the arrangement without cooling fins is higher than an arrangement with cooling fins having a spacing of 2.5 mm and that, in turn, it is higher than the temperature gradient in the arrangement according to FIG. 4C where the fin spacing is 1.25 mm.

Generally, it can be said that the lower the starting point on the ordinate and the flatter the curve, the lower the average temperature of the MEA and the smaller the temperature gradient and, therefore, the lower the risk of locally elevated current densities in the MEA.

Figure 7:
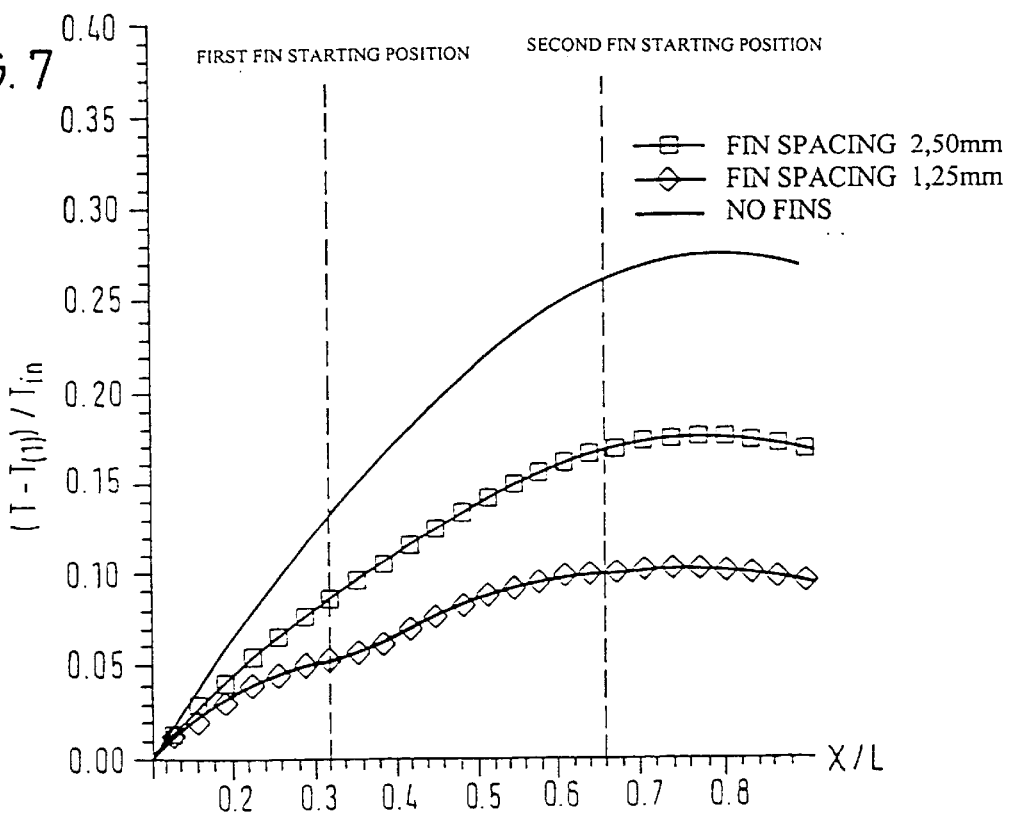
FIG. 7 is a standardized representation of the temperature distribution in the MEA along the length of the cooling gap L, i.e., as a function of the distance from the air inlet, where $T_1$ is the temperature at the beginning of the solid body of the MEA.

FIG. 7 shows the same curves as FIG. 6 but here for a temperature function $(T-T_{(1)})/T_{in}$ where T is the temperature of the solid at the different measurement sites along the cooling gap and $T_{(1)}$ is the temperature at the beginning of the solid. All curves start in the representation of FIG. 7 at the ordinate with the value of zero since T here is equal to $T_{(1)}$ so that the reported function must also have the value of zero for all variants. The differing steepnesses of the curves, however, express the fact that in the arrangement shown in FIG. 4A without cooling fins, the temperature of the cooling air at the outlet from the cooling gap is highest, while a distinct reduction in the air temperature is noted in the case of the fin arrangement with a spacing of 2.5 mm and an even more distinct temperature reduction in the arrangement in FIG. 4C with a cooling fin spacing of 1.25 mm.

It is essential in order to achieve the most favorable results of the invention that the specific surface of the cooling areas emitting heat to the coolant increase in the direction from the inlet to the outlet, which is achieved by the increasing fin area.

b) Description of the Geometry for Increasing the Local Heat Transfer Coefficient in the Flow Direction (Second Variant of the Invention)

How a cooling fin arrangement could be configured in order to achieve a higher average thermal transfer coefficient in the flow direction could be perceived in FIG. 8. As opposed to FIG. 9A which shows the cooling fin arrangement already described in FIG. 4B (continuous fins without staggering), in this arrangement (offset arrangement) the cooling fins 30 are interrupted repeatedly so as to provide a series of shorter fins aligned in the X direction. Otherwise, subdivision into only two regions is present. The cooling fin design is accordingly characterized by a series arrangement several shorter cooling fins or cooling bars 34. For both cases, calculations were always performed with constant material properties of the stack and in each case the same boundary conditions for the stream of cooling air. The calculated local heat transfer coefficients are given in the following Table 1 for the arrangements shown in 9A and FIG. 8A, in both cases the support material for the MEA 12 being steel and the fin spacing A in FIGS. 9A and 9B corresponding to that in FIG. 4B (2.5 mm fin spacing). The heat transfer coefficient α shown which is denoted by "h" in the drawings (i.e. α=h) has the following values:

TABLE 1

| FIG. 9A version | FIG. 8A version |
| --- | --- |
| $\alpha_{min}$ = 0.4 W/m$^2$/K | $\alpha_{min}$ = 0.1 W/m$^2$/K |
| $\alpha_{avg}$ = 8.04 W/m$^2$/K | $\alpha_{avg}$ = 7.99 W/m$^2$/K |
| $\alpha_{max}$ = 86.85 W/m$^2$/K | $\alpha_{max}$ = 122.1 W/m$^2$/K |

The figures in FIGS. 8A and 8B show an increase in the average heat transfer coefficient of the cooling fins in the direction of flow. The mode of action of the offset arrangement consists, on the one hand, of forming on each cooling bar a new startup flow with an increased heat transfer coefficient and on the other, an increase in the molecular heat diffusion inside the coolant by the cooling fins interrupted in the X direction compared to the non-offset arrangement.

In the cases shown here, the average heat transfer coefficient of the cooling fins is increased by 70% and compared to the non-offset arrangement causes a decrease in the maximum temperature by 6% and in the temperature gradient by 13% for a 45% smaller cooling fin area compared to the non-offset arrangement.

c) Description of the Effect of the Coefficient of Thermal Conductivity in the Case when Different Support Materials are Used for the MEA (Third Variant of the Invention)

In order to illustrate the effect of the coefficient of thermal conductivity when different support materials of the MEA are used, two calculations were performed with the same cooling fin arrangement, in each case with the same boundary conditions for the cooling air stream but with different support materials. As support materials, for example, the following materials were selected:

Steel: $k_{steel}$=27 W/(m·K)

Aluminum: $k_{aluminum}$=236 W/(m·K)

FIG. 10 shows the two calculated temperature curves of the MEA in the flow direction (X direction). One clearly sees that both the absolute temperatures of the MEA as well as the temperature gradient can be reduced by the use of highly heat-conductive support materials. In the cases shown here, the maximum temperature can be lowered by 5% and the temperature gradient by 70%.

An arrangement with cooling fins in one of the forms described above (possibilities a), b), or c)) lowers the temperature gradient in the solid of the fuel cell. The following advantages arise:

constant current density distribution, avoidance of "hot spots" which could lead to the failure of the cell, higher average cell temperature with a constant maximum temperature and a resulting higher power density.

Other Possibilities

As indicated above, the possibility also exists of designing the cooling gaps with structural elements which assure the generation of flow gradients which are so designed that the local holding time of the coolant flow along the cooling gaps increases and the heat removal is constantly increasing. The arrangement according to FIGS. 8A and 8B already goes along this line since the bars shown there assure swirling flow of the cooling air and therefore an elevated local holding time.

What is claimed is:

1. An air-coaled fuel cell stack comprising a plurality of discrete fuel cells each having a surface defining a cooling gap between said fuel cells, said gap being adapted to flow air between said fuel cells in a direction of flow extending from an inlet to said gap toward an outlet from said gap and having (1) a first region adjacent said inlet and defined by a first portion of said surface having a first cooling surface area and first heat transfer coefficient, and (2) a second region downstream of said first region adjacent said outlet and defined by a second portion of said surface (i) having a second cooling surface area and heat transfer coefficient greater than said first cooling surface area and heat transfer coefficient, and (ii) comprising a series of cooling fins which (a) are spaced apart in the direction of flow, (b) project from said second portion into said gap, and (c) are aligned in a plurality of substantially parallel rows extending in said direction of flow.

2. An air-cooled fuel cell according to claim 1 wherein the cooling fins in adjacent rows are staggered relative to each other in a direction transverse said direction of flow.

3. An air-cooled fuel cell according to claim 1 wherein said fuel cell comprises a membrane-electrode-assembly supported by a carrier material having a coefficient of thermal conductivity of above about 200W/(m·K).

4. An air-cooled fuel cell stack comprising a plurality of discrete fuel cells each having a surface defining a cooling gap between said fuel cells, said gap being adapted to flow air between said cells in a direction of flow extending from an inlet to said gap toward an outlet from said gap and having (1) a first region adjacent said inlet and defined by a first portion of said surface having a first heat transfer surface area (2) a second region downstream of said first region adjacent said outlet and defined by a second portion of said surface having a second heat transfer surface area greater than said first heat transfer surface area, and (3) a third region intermediate said first and second regions and defined by a third portion of said surface having a third heat transfer surface area intermediate said first and second heat transfer surface areas, a plurality of continuous first cooling ribs projecting into said second and third regions and spanning the length of said second and third regions in said direction of flow, and a second set of continuous cooling ribs projecting into said third region between said first ribs and spanning only the length of said third region in said direction of flow.

5. An air-cooled fuel cell according to claim 4 wherein said fuel cell comprises a membrane-electrode-assembly supported by a carrier material having a coefficient of thermal conductivity of above about 200W/(m·K).

* * * * *